A. M. SMITH.
TRAWL SETTER.
APPLICATION FILED JAN. 11, 1909.
921,902.
Patented May 18, 1909.
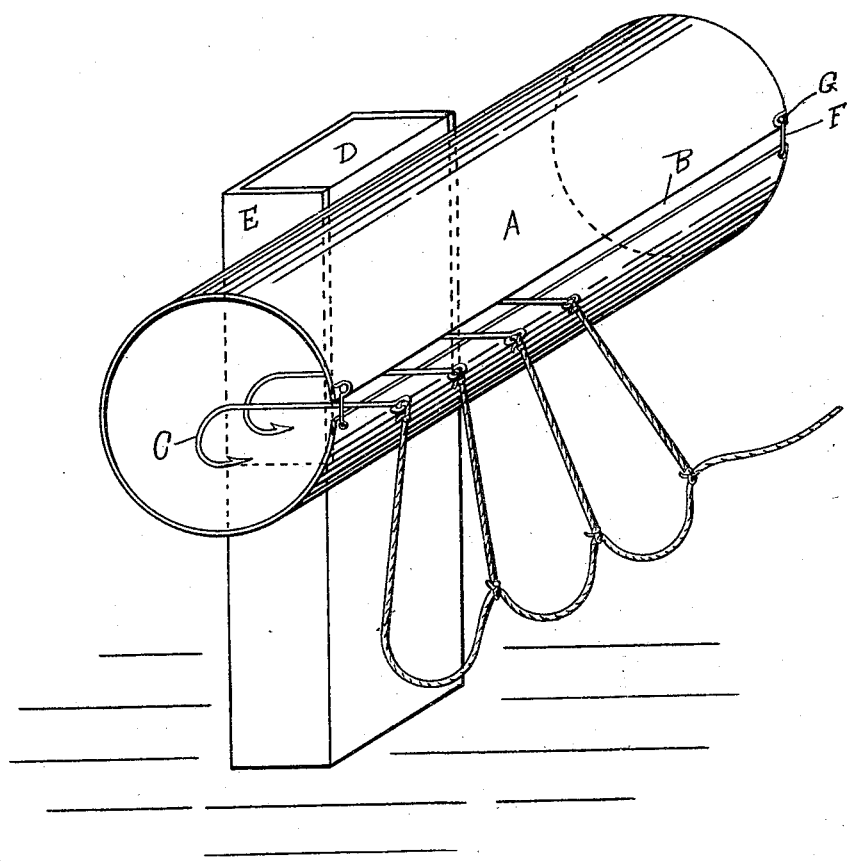
WITNESSES —
Lauren M. Sanborn,
Marion Richards.
INVENTOR —
Abiel M. Smith,
By Clifford Verrill Clifford.
Attorneys.

UNITED STATES PATENT OFFICE.

ABIEL M. SMITH, OF PORTLAND, MAINE.

TRAWL-SETTER.

No. 921,902.  Specification of Letters Patent.  Patented May 18, 1909.

Application filed January 11, 1909. Serial No. 471,573.

*To all whom it may concern:*

Be it known that I, ABIEL M. SMITH, a citizen of the United States, residing at Portland, in the county of Cumberland and State of Maine, have invented new and useful Improvements in Trawl-Setters, of which the following is a specification.

My invention relates to improvements in trawl setters.

The present practice is to bait the hooks and coil the trawl in a bucket and to take it out of the bucket by hand to set it.

The object of my invention is to provide a convenient receptacle or holder for the trawl from which the trawl can be set automatically.

To this end it consists of a hollow receptacle provided with a hook - receiving slot adapted to receive the shank of the hooks, the barbed end with the bait being positioned within the receptacle and the heel of the hook with the trawl line attached being positioned outside of the receptacle.

The drawing, consisting of one figure, is a perspective view of my improved trawl setter.

It consists preferably of a hollow tubular cylinder shaped receptacle A having a longitudinal slot B in one side thereof preferably below the center, when the trawl setter is in operative position. The hooks C after being baited are placed one after the other in position by inserting the shank thereof into the slot with the barbed end inside and moving them along one after another until the setter is filled or as many hooks are in position as desired.

The trawl setter when ready for operation is placed on a post D in any convenient manner and I have shown the setter provided with a loop E adapted to go on over the top of a post D. The ends of the slot may be closed to prevent accidental escape of the baited hooks in any convenient manner. For this purpose I have shown the setter provided near the end thereof with a hook F pivotally attached to one side and adapted to engage a pin G on the opposite side.

The shape of the trawl setter, the position of the slot, the means of supporting it and the means of closing the ends of the slot may be varied at will.

To set the trawl, the trawl setter is placed in position and the hook removed from across the slot. The trawl hooks are readily drawn through the slot out of the setter. After a few hooks are withdrawn their weight will cause the remaining ones to feed out automatically.

The advantages of my improved trawl setter are that it may be readily charged, the hooks and trawl lines cannot become snarled and the trawl can be set automatically.

Having thus described my invention and its use I claim:—

1. In a trawl setter, a hollow bait receiving receptacle provided with a longitudinal hook-receiving slot extending to the end of the receptacle.

2. In a trawl setter, a hollow bait receiving receptacle provided with a longitudinal hook-receiving slot extending to the end of the receptacle and means for temporarily closing the ends of said slot.

3. In a trawl setter, a hollow bait receiving receptacle provided with a longitudinal hook-receiving slot extending to the end of the receptacle and means for supporting the setter in operative position.

In testimony whereof, I have signed my name to this specification in presence of two subscribing witnesses this eighth day of January, 1909.

ABIEL M. SMITH.

In presence of—
ELGIN C. VERRILL,
MARION RICHARDS.